Nov. 30, 1965 H. EHRICH 3,221,252
MEASURING INSTRUMENT HAVING A ROTATABLE MEASURING MEMBER
FRICTIONLESSLY SUSPENDED FROM AN AUTOMATIC
FOLLOWER-INDICATOR MEMBER
BY ELASTIC MEANS
Filed Nov. 27, 1961 3 Sheets-Sheet 1

Inventor
HANS EHRICH

Inventor

HANS EHRICH

Nov. 30, 1965 H. EHRICH 3,221,252
MEASURING INSTRUMENT HAVING A ROTATABLE MEASURING MEMBER
FRICTIONLESSLY SUSPENDED FROM AN AUTOMATIC
FOLLOWER-INDICATOR MEMBER
BY ELASTIC MEANS
Filed Nov. 27, 1961 3 Sheets-Sheet 3
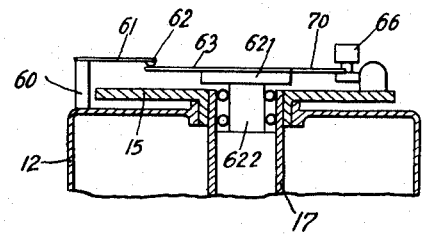
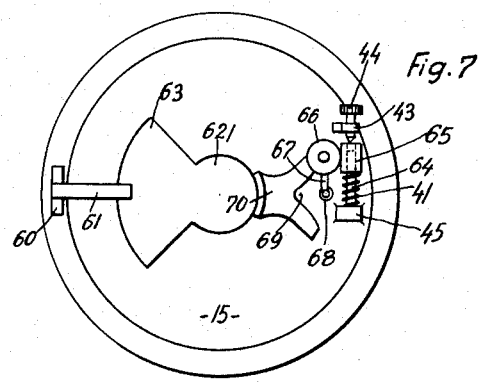
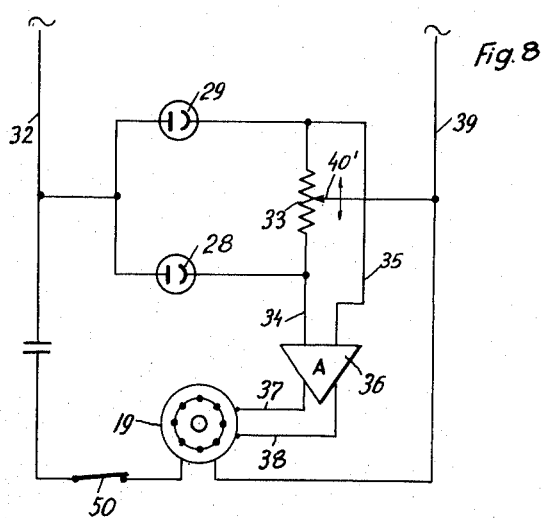
Inventor
HANS EHRICH United States Patent Office 3,221,252
Patented Nov. 30, 1965

3,221,252
MEASURING INSTRUMENT HAVING A ROTATABLE MEASURING MEMBER FRICTIONLESSLY SUSPENDED FROM AN AUTOMATIC FOLLOWER-INDICATOR MEMBER BY ELASTIC MEANS
Hans Ehrich, Kiel-Schulensee, Germany, assignor to Anschutz & Co. G.m.b.H., Kiel-Wik, Germany, a limited-liability company of Germany
Filed Nov. 27, 1961, Ser. No. 155,078
Claims priority, application Germany, Nov. 29, 1960, A 36,156
6 Claims. (Cl. 324—99)

My invention relates to a measuring instrument of the type having a measuring member connected with a follower member by elastic means and to a method of adjusting such instrument.

It is a primary object of my invention to provide an improved measuring instrument of the type indicated in which means are provided affording a possibility of so adjusting the instrument that an error introduced by stresses set up in the elastic means can be readily eliminated. More particularly, it is an object of the invention to provide a simple method of so adjusting the instrument as to eliminate said error.

Further objects of my invention will appear from a detailed description of some embodiments of my invention with reference to the accompanying drawings. It is to be understood, however, that my invention is in no way restricted or limited to such details but is capable of numerous modifications within the scope of the appended claims and that the terms and phrases used in such detailed description have been chosen for the purpose of explaining rather than that of restricting or limiting the invention.

With the afore said objects in view my invention consists in the novel combinations and arrangements of parts hereinafter described in such preferred embodiments, pointed out in the subjoined claims and illustrated in the annexed drawings.

In these drawings

Figure 1:
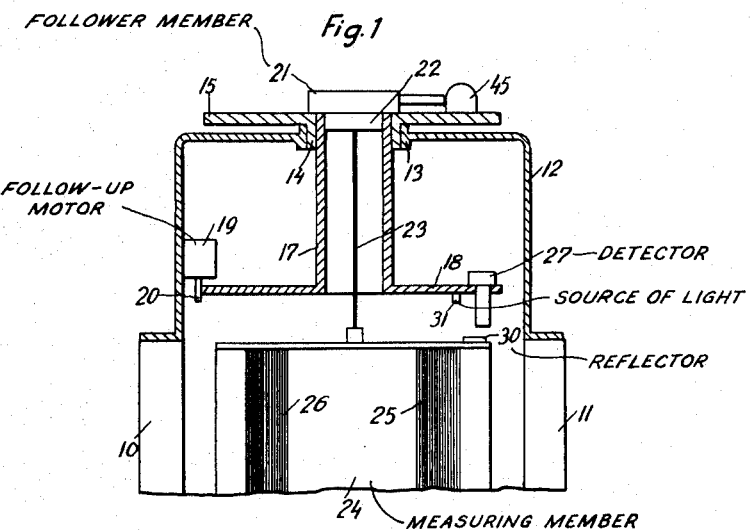
Figure 2:
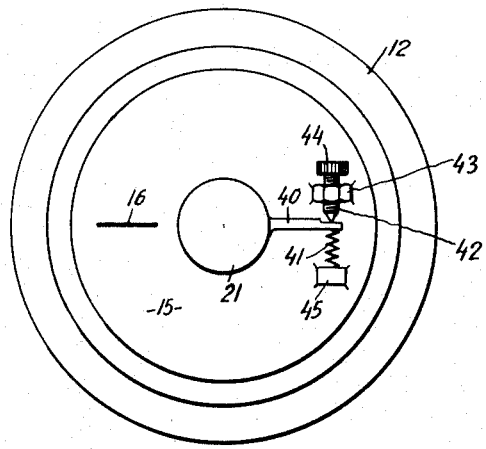

FIG. 1 is a partial vertical section through an electrical measuring instrument to which my invention is applicable, FIG. 2 is a plan view of the instrument shown in FIG. 1, FIGS. 3a–5c are diagrammatic representations of various angular positions of the elements of the instrument shown in FIGS. 1 and 2, FIG. 6 is an axial section through the upper part of a modification of the instrument shown in FIGS. 1 and 2, FIG. 7 is a plan view of the instrument shown in FIG. 6, and FIG. 8 is an electrical circuit system of sensing means similar to those diagrammatically indicated in FIG. 1 and so modified as to constitute an alternative embodiment of my invention.

The electrical measuring instrument illustrated in FIGS. 1 and 2 will now be described in detail. A permanent magnet in form of a flat iron bar of elongate rectangular cross-section bent into U-shape so as to have parallel arms is placed on a bed plate not shown in horizontal position. In FIG. 1 the end faces of the parallel arms 10 and 11 are partly visible. On top of this magnet a substantially cylindrical housing 12 is placed having a vertical axis disposed in the plane of symmetry bi-secting the permanent magnet. An annular reinforcing member 13 integral with the edge of a central aperture provided in the top of the housing 12 constitutes a bearing for rotatably accommodating the hub 14 of a disk 15 provided with an indicating mark 16, FIG. 2. A sleeve 17 is inserted in the hub 14 and fixed thereto and extends downwardly into the housing and at its lower end carries a horizontal circular disk 18 fixed thereto. An electric motor 19 is firmly mounted on the inside of the peripheral wall of the housing 12 in vertical position. A stud shaft 20 fixed to its armature frictionally engages the periphery of the disk 18. A substantially cylindrical follower member 21 is placed on the upper end of sleeve 17 and on the disk 15 and has a reduced lower portion 22 seated within the sleeve 17. A thin metal strip 23 is so fixed to the supporting member 21 as to extend downwardly from the center thereof through the sleeve 17 projecting from the lower end thereof. A cylindrical body 24 is fixed to the lower end of the metal strip 23 and carries a pair of coils 25 and 26 of insulated wire. Each coil is composed of substantially parallel windings extending around the top face, the peripheral face and the bottom face of the body 24 so as to have a substantially horizontal axis. The axis of coil 25 intersects the axis of coil 26 at right angles.

The elements 13, 14, 15, 17, 18, 21, 22, 23, and 24 are disposed in coaxial relationship to each other.

The instrument serves the purpose of measuring the relative magnitude of low currents which are conducted by suitable means not shown through the coils 25 and 26. Under the influence of the magnetic field extending between the arms 10 and 11 of the permanent magnet through the body 24, the coils 25 and 26 will exert a force tending to rotate the body to a predetermined angular position depending upon the relative magnitudes of the currents to be measured. If desired, the bed plate (not shown) may be provided with a suitable bearing in which a pin fixed to the bottom face of the body 24 is centered.

When the relative magnitude of the currents energizing the coils 25 and 26 varies, the body 24 will tend to turn into another angular position.

It is desirable that this angular position be not influenced by any torque that strip 23, when twisted, would exert on body 24. Therefore, the motor 19 is so controlled by a detector 27 mounted on disk 18 and cooperating with the body 24 as to turn the rotary unit composed of the elements 14, 15, 17 and 18 in a manner causing the supporting member 21 to follow any angular movement of the body 24.

The detector 27 may sense any positional angular disagreement existing between the members 21 and 24 in any desirable and well known manner, for instance photoelectrically. A photoelectrical detector 27 for that purpose may comprise a pair of photoelectric cells 28 and 29 (FIG. 8) so mounted as to receive light from a small reflector 30 (FIG. 1) which is mounted on the top face of the body 24 so as to reflect light received from a suitable source 31 mounted on the bottom of disk 18. The anodes of the photo-cells 28 and 29 are connected with each other and with one terminal 32 (FIG. 8) of a source of alternating current. A potentiometer 33 is connected between the cathodes of the photoelectric cells 28 and 29 and between the input leads 34 and 35 of an amplifier 36 whose output leads 37 and 38 are connected with the electric motor 19. The other terminal 39 of the source of alternating current is connected to the wiper 40' of the potentiometer 33.

The electric motor 19 is preferably an asynchronous motor of the squirrel cage type, the stator of this motor having two phase windings, one of these windings being connected to the source 32, 39 of alternating current through a capacitor and the other phase winding being connected to the leads 37 and 38.

When the angular positional disagreement between the disk 18 and the body 24 is zero, the photoelectric cells 28 and 29 will receive equal quantities of light and will thus have equal resistances. As a result, no voltage will be produced between the input lines 34 and 35 of the amplifier and the output voltage thereof will be zero, thus holding the follow-up motor 19 at rest. When the body 24, however, acting under a force tending to move it into a predetermined angular position turns relative to the disk 18, the quantities of light received by the photoelectric cells 28 and 29 from the reflector 30 will become different and, as a result, a voltage will be produced between the input leads 34 and 35, thus causing the amplifier 36 to supply the reversing winding of the follow-up motor 19 with a voltage causing it to rotate in such a direction as to minimize the positional disagreement between the disk 18 and the body 24. Therefore, the angular position of the body 24 will be indicated at any time by the indicating mark 16 provided on disk 15 which is rigidly connected with the disk 18 for common rotation therewith.

From the above is will be readily appreciated, that the body 24 constitutes a measuring member which is rotatably mounted about its axis and subject to a force tending to move it into a predetermined angular position; that the member 21 constitutes a follower member which is rotatably mounted in the frame 12 coaxially with respect to the measuring member 24; that the thin metal strip 23 constitutes elastic means connecting the members 21 and 24; that the unit formed by the rigidly connected elements 14, 15, 17, 18, 27 constitutes sensing means coordinated to the members 21 and 24 for detecting positional disagreement therebetween; that the motor 19 constitutes follow-up driving means controlled by the sensing means and connected with the frame 12 and with the follower member 21 (through the intermediary of the elements 17 and 18) to turn the follower member 21 about its axis relative to the measuring member 24 so as to reduce said positional disagreement to a minimum.

Moreover, it will be appreciated that the sensing means just referred to comprises an indicator, such as the unit composed of the elements 14, 15, 17 and 18, such indicator being mounted in the frame 12 for rotation about the main axis, and a detector, such as 27, mounted on the indicator and coordinated to the measuring member 24 for detecting the angular positional disagreement.

Having now described an instrument of the type to which my invention is applicable, I shall now proceed to explain the objects of my invention in detail.

While the measuring member 24 tends under the force exerted thereon by the electromagnetic field of the permanent magnet to turn into a predetermined angular position of equilibrium, which is indicative of the parameter to be measured, it may happen that an interfering torque acts on the measuring member 24 additionally and turns it so far from the desirable position of equilibrium until the directional torque exerted by the permanent magnet and the interferring torque will balance each other. Hence, the measuring member 24 will assume a novel position of rest and its indication, therefore, will include an error caused by the interferring torque.

Such an interfering torque may be produced, for instance, by the tensional stresses set up in the elastic means 23 by the weight of the member 24.

The directional torque produced by the permanent magnet is proportional to the rotational displacement of the measuring member 24 from its position of rest. The ratio of this directional torque R to the angle of displacement will be called coefficient $c_1$ hereinafter. Hence, $c_1 = R$.

Another coefficient $c_2$ is the ratio of the interferring torque M to the angle of twist of the metal strip 23. Hence, $M = c_2$. Provided that no other couples act on the measuring member 24, the directional torque and the interfering torque will balance each other which means that $c_1 = c_2$. Hence, the error can be expressed by the equation $c_2/c_1$.

In order to eliminate the error caused by the interfering torque, it was necessary heretofore to adjust the instrument with the aid of prior calibrations. In the absence of such prior calibrations, the adjustment was not possible. Where the measuring instrument is a compass for instance, the measuring member indicating a predetermined geographical direction, the re-adjustment of the instrument required knowledge of a predetermined geographical direction. In the absence of such knowledge, or where a predetermined direction could not be established by optical means because of a limited field of view, it was not possible to effect the re-adjustment of the compass.

Therefore, it is the object of the present invention to provide improved means and a method for readily ascertaining and eliminating the error described hereinabove.

In order to attain this object, I have provided manually operable means which are coordinated to the sensing means, such as 14, 15, 17, 18, 27 for the purpose of angularly adjusting the position thereof about the main axis relative to one of the members 21 and 24.

These manually operable adjusting means are illustrated in FIG. 2 as comprising a radial horizontal arm 40 integral with a member 21 held by a horizontal helical pressure spring 41 in permanent engagement with the point end of a horizontal adjusting screw 42 extending substantially at right angles to the arm 40 and threadingly engaging a horizontal threaded bore of a bracket 43 fixed to the disk 15. The screw 42 has a head 44 which is preferably provided with graduations in order to facilitate its adjustment. These graduations are spaced a distance which indicates the adjustment of the relative angular position of member 21 and disk 15 by one angular measuring unit, such as one degree, one minute or one second. The pressure spring 41 is preferably inserted between the arm 40 and a supporting block 45 fixed to the disk 15.

In FIGS. 3a–3c, 4a–4c and 5a–5c I have diagrammatically illustrated the coaxial relatively rotatable elements formed by the follower member 21, the indicator 15 and the measuring member 24.

Let it be assumed that the directional force representative of the parameter to be measured tends to move the measuring member 24 into the position in which the arrow 24' shown therein in these figures points upwardly; that, in fact, however, the angular position of the measuring member 24 differs from its correct position by an error which is indicative of a deflecting torque exerted upon the measuring member 24 by the elastic means 23.

The deflecting torque causing the error can have various causes. Thus, the tensional stress produced in the metal strip by the weight of the measuring member 24 may cause the strip to exert the deflecting torque. Alternatively, a relative angular displacement may have occurred between the follower member 21 and the sensing means 14, 15, 17, 18, 27 owing to inaccurate assembly. A third cause can be an inaccurate connection of the measuring member 24 with the metal strip 23.

Figure 3A:
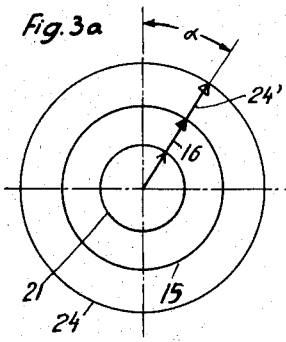
Figure 4A:
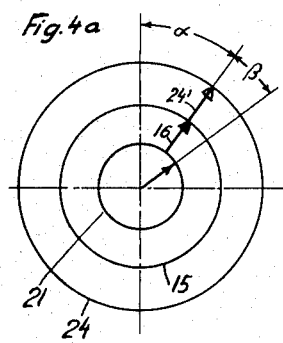

FIG. 3a indicates the elements of the instrument in the position which they assume when the follow-up motor 19 is in operation so as to eliminate any angular positional disagreement of the member 24 with the members 15 and 21. The error is caused in this instance by a twisting torque exerted by the elastic means 23 upon the measuring member 24. In FIG. 4a I have shown the elements in a position in which the error is caused by an erroneous assembly resulting in displacement of the follower member 21 relative to the indicator 15 by an angle.

Figure 5A:
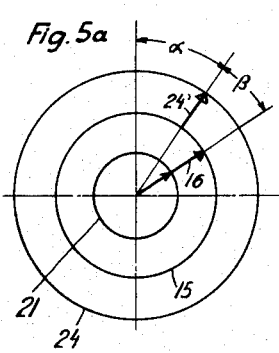

In FIG. 5a I have shown the elements in a position in which the error is caused by an erroneous assembly producing angular displacement of the detector 27 carried by the indicator 15 relative to the measuring member 24 by the angle.

In order to eliminate the error in any one of the three cases illustrated in FIGS. 3a, 4a and 5a I proceed as follows:

First, I de-energize the follow-up driving means, for instance by opening a switch 50 in FIG. 8. Moreover, I de-energize the directional forces, for instance by interrupting the connection of the coils 25 and 26 with their supply conductors. As a result, the indicator 15 and the follower member 21 connected therewith retain their position shown in FIGS. 3a, 4a and 5a. The measuring member 24, however, rotates through the angle into the positions shown in FIGS. 3b, 4b and 5b. Then I measure the position of the mark 16 to thereby detect the consequent first angular position of the follower member 21 relative to the frame 12. Thereafter, I energize the follow-up driving means again by closing the switch 50 while keeping the directional force in cut-off condition. As a result, the follow-up motor 19 will rotate the indicator 15 and the follower member 21 through the angle so as to bring the mark 16 in FIGS. 3c and 4c into alignment with the arrow 24' and to bring the mark 16 out of alignment therewith in FIG. 5c. Then I measure the second angular position of the indicator 15 relative to the frame. Thereafter, I adjust the manually operable means 42, 44 to effect the displacement through the angle which represents the difference between said first angular position and said second angular position. This adjustment must be effected in such a direction, of course, that the error to be eliminated will become a minimum.

Figure 3B:
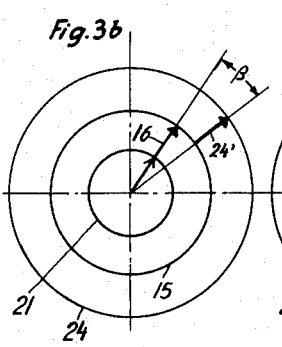
Figure 3C:
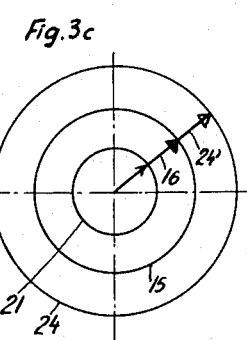

From this explanation it will be readily appreciated that by successively moving the three elements 21, 15 and 24 to the position shown in FIG. 3b and to the position shown in FIG. 3c I detect the angle. Once the angle is known, the adjustment of the screw 42, 44 which will eliminate the error is readily possible by simply setting back the indicator 15 relative to the follower member 21 through the angle.

Figure 4B:
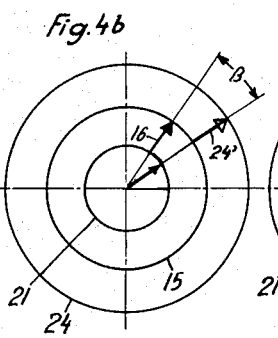
Figure 4C:
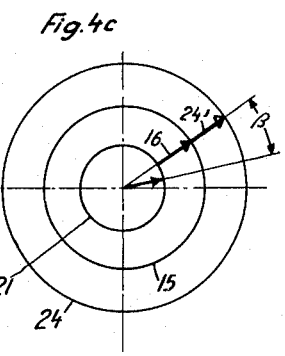
Figure 5B:
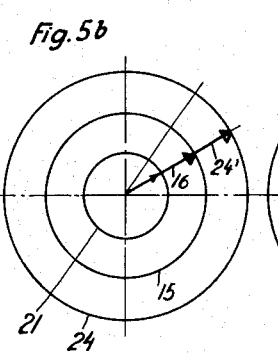
Figure 5C:
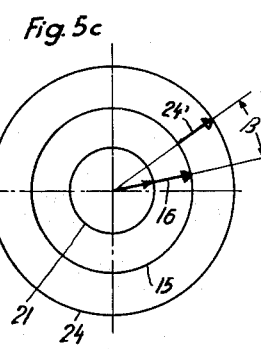

It has been presumed hereinabove that the measuring member 24 will retain its angular position during the transition from the condition shown in FIGS. 3b, 4b and 5b to the condition shown in FIGS. 3c, 4c and 5c. This presumption, however, is not quite in keeping with the facts because during this interval the rotation imparted by the follow-up motor 19 to the follower member 21 will twist the elastic means 23 and thus cause the measuring member 24 to be angularly accelerated. Where the momentum of the measuring member 24 is large, this acceleration will be so slow as to have a negligible effect only upon the second angular position of the follower member 21 before the same can be detected. Where the deflection exerted by the elastic means 23 is comparatively large in relation to the momentum of the measuring member 24, it will be necessary to provide means for disconnecting the indicator member 15 from the follower member 21 and for arresting the latter preparatory to the step of energizing the follow-up driving means while keeping the directional force de-energized.

In FIGS. 6 and 7 I have illustrated suitable means for accomplishing such operation. The follower member 621 has a lower portion 622 of reduced diameter which is journaled in the sleeve 17 by anti-friction bearings. A standard 60 is fixed to the top of housing 12 and carries a leaf-spring 61 to which a brake-shoe 62 is fixed. This brake-shoe engages a sector-shaped portion 63 of the follower member 621 under the pressure exerted by the spring-leaf 61. A horizontal pin 64 is fixed to the block 45 and carries the helical spring 41 but projects out of this spring. On its projecting end a sleeve 65 is non-rotatably guided for lengthwise displacement. This sleeve carries the stator of a rotary electromagnet 66 in which an armature is journaled for rotation about a vertical axis. Upon energization of the windings of the stator, the armature tends to rotate in clockwise direction. This armature has an arm 67 provided with a follower roller 68 adapted to engage one or the other edge of a V-shaped recess 69 provided in an arm 70 of the follower member 621. Therefore, energization of the rotary electromagnet 66 causes the follower roller 68 to engage one or the other of the bifurcations of arm 70 or both and to thereby turn arm 70 into a predetermined angular position relative to the indicator 15. De-energization of the rotary electromagnet 66, however, has the effect that the follower member 621 will be enabled to remain arrested by the brake-shoe 62 without interfering with rotation of the indicator 15.

With the mechanism shown in FIGS. 6 and 7 my adjusting method is practiced as follows: First, I de-energize the follow-up driving means 19 and the directional force. Then I measure the consequent first angular position of the indicator 15 relative to the frame 12. Then I disconnect the indicator 15 from the follower member 621 and arrest the latter by de-energization of the rotary electromagnet 66. Then I energize the follow-up driving means 19 while keeping the directional force de-energized. Thereafter, I measure the consequent second angular position of the indicator 15 relative to the frame 12. Then I reconnect the indicator 15 with the follower member 621 and release the latter by energizing the rotary electromagnet 66. Thereafter, I adjust the screw 44 in FIG. 7 to effect angular displacement of the sensing means 14, 15, 17, 18, 27 relative to the follower member 621 through the angle.

Whereas the manually operable means formed by the adjusting screw 42, 44 serves for angularly adjusting the position of the sensing means 14, 15, 17, 18, 27 relative to the follower member 21, I may similarly attain the objects of my invention by providing manually operable means for angularly adjusting the position of the sensing means relative to the measuring member 24. Such manually operable means are constituted by the wiper 40 of the potentiometer 33 in FIG. 8. Any manual displacement of this wiper from its central position of symmetry to a non-symmetrical position will cause the follow-up motor 19 to drive the sensing means 14, 15, 17, 18, 27 to a different angular normal position in which one of the photoelectric cells 28, 29 receives more light from the reflector 30 than the other photoelectric cell. When this slightly different normal position will have been reached, the input voltage supplied to the amplifier 36 will become zero and will stop the follow-up motor 19. Any departure from this slightly different normal relative position of the sensing means and of the measuring member will cause the detector 27 to put the follow-up motor 19 into operation until this normal relative position has been re-established. Therefore, it will be appreciated that the wiper 40 constitutes manually operable means coordinated to said sensing means for angularly adjusting the position thereof about the main axis relative to the measuring member.

While my invention has been described hereinabove as applied to an electrical measuring instrument, it is equally applicable to all other instruments in which the measuring member is subjected to a directional force, such as magnetic compasses, gyroscopic compasses, a pendulum, or the like.

The advantages of the invention as here outlined are best realized when all of its features and instrumentalities are combined in one and the same structure, but useful devices may be produced embodying less than the whole.

From the foregoing it will be seen that this invention is one well adapted to attain all of the ends and objects hereinabove set forth, together with other advantages which are obvious and which are inherent to the combination.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a measuring instrument, the combination comprising a frame, a measuring member rotatably mounted therein about an axis and subject to a force tending to move it into a predetermined angular position, a follower member rotatably mounted in said frame coaxially with respect to said measuring member, supporting spring means carried by said follower member and connected to said measuring member for supporting it for frictionless rotation about said axis, sensing means coordinated to said members for detecting angular positional disagreement therebetween, follow-up driving means controlled by said sensing means and connected with said frame and with said follower member to turn the latter about its axis relative to said measuring member so as to reduce said positional disagreement to a minimum, and manually operable means coordinated to said sensing means for angularly adjusting the position thereof about said axis relative to one of said members.

2. The combination claimed in claim 1 in which said manually operable means include a graduated manually rotatable member, the graduations of said member being spaced a distance indicating the adjustment of the position of said sensing means in degrees.

3. In a measuring instrument, the combination comprising a frame, a measuring member rotatably mounted therein about an axis and subject to a force tending to move it into a predetermined angular position, a follower member rotatably mounted in said frame coaxially with respect to said measuring member, supporting spring means carried by said follower member and connected to said measuring member for supporting it for frictionless rotation about said axis, sensing means coordinated to said members for detecting angular positional disagreement therebetween, follow-up driving means controlled by said sensing means and connected with said frame and with said follower member to turn the latter about its axis relative to said measuring member so as to reduce said positional disagreement to a minimum, and manually operable means coordinated to said sensing means for angularly adjusting the position thereof about said axis relative to said follower member.

4. In a measuring instrument the combination comprising a frame, a measuring member rotatably mounted therein about an axis and subject to a force tending to move it into a predetermined angular position, a follower member rotatably mounted in said frame coaxially with respect to said measuring member, supporting spring means carried by said follower member and connected to said measuring member for supporting it for frictionless rotation about said axis, sensing means coordinated to said members for detecting angular positional disagreement therebetween, follow-up driving means controlled by said sensing means and connected with said frame and with said follower member to turn the latter about its axis relative to said measuring member so as to reduce said positional disagreement to a minimum, and manually operable means coordinated to said sensing means for angularly adjusting the position thereof about said axis relative to one of said members, said sensing means being formed by an indicator mounted in said frame for rotation about said axis and by a detector mounted on said indicator and coordinated to said measuring member for detecting said angular positional disagreement, said indicator being releasably connected with said follower member and being mounted in driving connection with said follow-up driving means.

5. Method of adjusting a measuring instrument of the type comprising a frame, a measuring member rotatably mounted therein about an axis and subject to a force tending to move it into a predetermined angular position, a follower member rotatably mounted in said frame coaxially with respect to said measuring member, supporting spring means carried by said follower member and connected to said measuring member for supporting it for frictionless rotation about said axis, sensing means coordinated to said members for detecting angular positional disagreement therebetween, follow-up driving means controlled by said sensing means and connected with said frame and with said follower member to turn the latter about its axis relative to said measuring member so as to reduce said positional disagreeent to a minimum, and manually operable means coordinated to said sensing means for angularly adjusting the position thereof about said axis relative to one of said members, which method, for the purpose of eliminating an error caused by an interfering torque, comprises the steps of de-energizing said follow-up driving means and said force for determining the consequent first angular position of said follower member relative to said frame, energizing said follow-up driving means while keeping said force de-energized thereby causing said follow-up driving means to rotate said follower member to an angular position of minimum positional disagreement from the position of said measuring member for determining the consequent second angular position of said follower member relative to said frame, and adjusting said manually operable means through the angle between said first angular position and said second angular position in a direction minimizing said angle.

6. Method of adjusting a measuring instrument of the type comprising a frame, a measuring member rotatably mounted therein about an axis and subject to a force tending to move it into a predetermined angular position, a follower member rotatably mounted in said frame coaxially with respect to said measuring member, supporting spring means carried by said follower member and connected to said measuring member for supporting it for frictionless rotation about said axis, sensing means coordinated to said members for detecting angular positional disagreement therebetween, follow-up driving means controlled by said sensing means and connected with said frame and with said follower member to turn the latter about its axis relative to said measuring member so as to reduce said positional disagreement to a minimum, and manually operable means coordinated to said sensing means for angularly adjusting the position thereof about said axis relative to one of said members, said sensing means being formed by an indicator mounted in said frame for rotation about said axis and by a detector mounted on said indicator and coordinated to said measuring member for detecting said angular positional disagreement, said indicator being releasably connected with said follower member and being mounted in driving connection with said follow-up driving means, which method, for the purpose of eliminating any error caused by an interfering torque, comprises the steps of de-energizing said follow-up driving means and said force for determining the consequent first angular position of said indicator relative to said frame, disconnecting said indicator from said follower member and arresting the latter, energizing said follow-up driving means while keeping said force de-energized thereby causing said follow-up driving means to rotate said indicator to an angular position of minimum positional disagreement from the position of said measuring member for determining the consequent second angular position of said indicator relative to said frame, reconnecting said indicator with said follower member and releasing the latter, and adjusting said manually operable means to effect displacement through the angle between said first angular position and said second angular position in a direction minimizing said angle.

References Cited by the Examiner

UNITED STATES PATENTS

| | | | |
|---|---|---|---|
| 2,326,252 | 8/1943 | Rich | 324—97 |
| 2,924,761 | 2/1960 | Kuhn | 318—31 |

WALTER L. CARLSON, *Primary Examiner.*

FREDERICK M. STRADER, *Examiner.*

DONALD R. GREENE, JOHN J. MULROONEY,
*Assistant Examiners.*